US 6,678,142 B2

(12) United States Patent
Aign et al.

(10) Patent No.: US 6,678,142 B2
(45) Date of Patent: Jan. 13, 2004

(54) METHOD OF CONTROLLING AN ACTUATOR

(75) Inventors: Torsten Aign, Thanhausen (DE); Jürgen Bastian, Zeitlarn (DE); Thomas Burkhardt, Donaustauf (DE); Michael Kilger, Abensberg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/200,654

(22) Filed: Jul. 22, 2002

(65) Prior Publication Data
US 2003/0026056 A1 Feb. 6, 2003

Related U.S. Application Data

(63) Continuation of application No. PCT/DE01/00225, filed on Jan. 19, 2001.

(30) Foreign Application Priority Data

Jan. 20, 2000 (DE) .......................... 100 02 322

(51) Int. Cl.⁷ .................... H01H 47/04; H01H 47/22
(52) U.S. Cl. ............................ 361/154; 361/194
(58) Field of Search ............................ 361/154, 155, 361/194, 156; 123/490

(56) References Cited

U.S. PATENT DOCUMENTS 5,818,680 A * 10/1998 Schmitz et al. ............ 361/160
6,209,513 B1 * 4/2001 Sakasai et al. ............. 123/299
6,249,418 B1 * 6/2001 Bergstrom .................. 361/139
6,292,345 B1    9/2001 Muller et al.
6,518,748 B2 * 2/2003 Butzmann et al. ...... 324/207.16
6,616,896 B2 * 9/2003 Apperson et al. ........... 361/187

FOREIGN PATENT DOCUMENTS

| DE | 44 34 684 A1 | 4/1996 |
| DE | 197 45 536 C1 | 5/1999 |
| DE | 198 06 619 A1 | 8/1999 |
| DE | 198 26 037 A1 | 12/1999 |
| EP | 0 816 644 A2 | 1/1998 |
| WO | WO 99/17009 | 4/1999 |

* cited by examiner

Primary Examiner—Brian Sircus
Assistant Examiner—Z Kitov
(74) Attorney, Agent, or Firm—Laurence A Greenberg; Werner H. Stemer; Gregory L. Mayback (57) ABSTRACT

An actuator has an actuating element and an actuating drive with an electromagnet with a coil. An armature, which can be coupled to the actuating element, can move between a first contact surface on the electromagnet and a second contact surface. An initial current or a higher holding current flows through the coil until a time at which the armature plate is reliably in contact with the contact surface of the electromagnet. An operating state of high-speed current reduction is then selected, wherein the opposite polarity of the supply voltage in comparison to the initial current flow is applied to the coil. A holding current then flows through the coil.

6 Claims, 6 Drawing Sheets

FIG 2

| FIG 3A | BZ1 | T1 | T2 | T3 |
|---|---|---|---|---|
| | RZ | OFF | OFF | OFF |
| | NB | ON | ON | OFF |
| | FL | OFF | ON | OFF |
| | SSR | OFF | OFF | OFF |
| | SB | OFF | ON | ON |

| FIG 3B | BZ2 | T1' | T2' | T3' |
|---|---|---|---|---|
| | RZ | OFF | OFF | OFF |
| | NB | ON | ON | OFF |
| | FL | OFF | ON | OFF |
| | SSR | OFF | OFF | OFF |
| | SB | OFF | ON | ON |

FIG 4

METHOD OF CONTROLLING AN ACTUATOR

CROSS-REFERENCE TO RELATED APPLICATION

This application is a continuation of copending International Application No. PCT/DE01/00225, filed Jan. 19, 2001, which designated the United States and which was not published in English.

BACKGROUND OF THE INVENTION

Field of the Invention

The invention relates to a method for controlling an actuator. It relates in particular to an actuator for controlling an internal combustion engine.

A control process for controlling an actuator is disclosed in the commonly assigned U.S. Pat. No. 6,292,345 B1 (international PCT publication WO 99/17009). The actuator has an actuating element which is, for example, in the form of an inlet or outlet valve of an internal combustion engine. Furthermore, the actuator has an actuating drive with two electromagnets, between which an armature plate can in each case be moved against the force of a resetting means by switching off the coil current to the holding electromagnet and by switching on the coil current to the catching electromagnet. The coil current for the respective catching electromagnet is kept constant at a predetermined capture value for a predetermined time period. Then, immediately before the armature plate arrives at the respective contact surface, an increased holding current is set for a further predetermined time period until it is certain that the armature plate is in contact with the contact surface. A free-wheeling process is then switched, during which the current decreases until it reaches a predetermined holding value, at which it is then regulated until the armature plate is intended to be moved back to the other contact surface. The current is then reduced to a zero value.

SUMMARY OF THE INVENTION

It is accordingly an object of the invention to provide a method for controlling an actuator, which overcomes the above-mentioned disadvantages of the heretofore-known devices and methods of this general type and which ensures that the actuator is driven precisely even with high loads.

With the foregoing and other objects in view there is provided, in accordance with the invention, a method for controlling an actuator, the actuator comprising an actuating element and an actuating drive with at least one electromagnet having a coil, and an armature movably disposed between a first contact surface on the electromagnet and a second contact surface, the method which comprises:

conducting an initial current or a relatively higher holding current with a given polarity through the coil until a time at which the armature is reliably in contact with the first contact surface on the electromagnet;

subsequently selecting an operating state of high-speed current reduction, and thereby applying to the coil an opposite polarity of a supply voltage in comparison with the given polarity; and conducting a holding current through the coil.

In accordance with an added feature of the invention, the operating state of high-speed current reduction comprises charging an electrical energy store from the coil.

In accordance with another feature of the invention, the method is implemented in an internal combustion engine and the actuating element is a gas exchange valve of the internal combustion engine. In this case, as an alternative to the selection of the operating state of high-speed current reduction, the system selects an operating state of free-wheeling when a condition is satisfied which depends on at least one variable represents the load on the internal combustion engine.

In accordance with a preferred feature of the invention, the variable representing the load on the engine is an air mass flow and a speed of the engine.

In accordance with a concomitant feature of the invention, the operating state of high-speed current reduction is selected for a predetermined time period, and the time period is determined as a function of the holding current and the initial current or the relatively higher holding current.

In other words, the invention is distinguished by the fact that the transition from controlling the capture current or the increased holding current in the coil to controlling the holding current takes place by way of an operating state of high-speed current reduction. The holding current is thus reached considerably more quickly than with the method that is known from the prior art. This ensures that, even when an internal combustion engine is operating at very high speeds and the engine load is at the same time low, the actuating elements, which are in the form of intake or outlet valves, can be driven precisely, since the holding current level is reached very quickly. If the coil is then switched off from the holding current level, then the time period (sticking time) which is required before the armature plate is detached from the respective contact surface can thus be determined precisely in advance, since the holding current level is predetermined.

Other features which are considered as characteristic for the invention are set forth in the appended claims.

Although the invention is illustrated and described herein as embodied in a method for controlling an actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
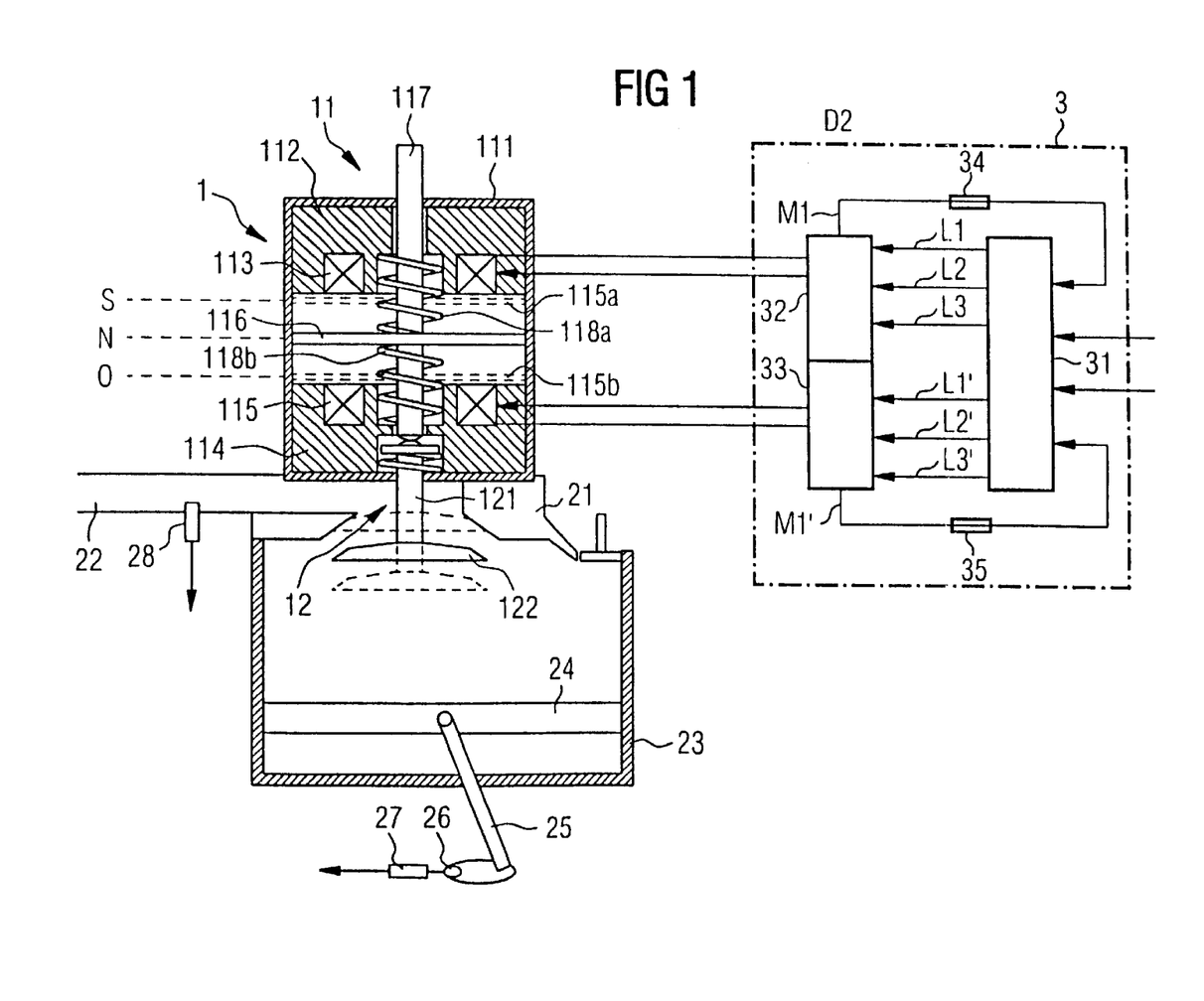
FIG. 1 is a schematic and diagrammatic illustration of a configuration of an actuator and a control device in an internal combustion engine.

Referring now to the figures of the drawing in detail and first, particularly, to FIG. 1 thereof, there is shown an actuator with an actuating drive 11 and an actuating element 12 (final control element), which is preferably in the form of an intake valve or outlet valve, and has a stem 121 and a plate 122. The actuating drive 11 has a housing 111, wherein a first and a second electromagnet are arranged. The first electromagnet has a first core 112, wherein a first coil 113 is embedded in an annular groove. The second electromagnet has a second core 114, wherein a second coil 115 is embedded in a further annular groove.

An armature is provided, whose armature plate 116 is arranged in the housing 111 such that it can move between a first contact surface 115a on the first electromagnet and a second contact 115b on the second electromagnet. The armature furthermore has an armature shaft 117, which is guided through recesses in the first and in the second core 112, 114, and which can be mechanically coupled to the stem 121 of the actuating element 12.

A first resetting means 118a and a second resetting means 118b prestress the armature plate 116 to a predetermined rest position N.

The actuator 1 is rigidly connected to a cylinder head 21. The cylinder head 21 has an associated induction channel 22 and an associated cylinder 23 with a piston 24. The piston 24 is coupled to a crankshaft 26 via a connecting rod 25.

A control device 3 is provided, which detects signals from sensors and/or detects signals from a non-illustrated higher-level control device for engine operating functions, and produces actuating signals on the basis of which the first and the second coil 113, 115 of the actuator 1 are controlled. The sensors which are associated with the control device 3 are in the form of a first current measuring device 34, which detects an actual value I_AV1 of the current through the first coil, or a second current measuring device 35, which detects an actual value I_AV2 of the current through the second coil. Furthermore, the control device 3 also has an associated air mass flow sensor 28 or a rotation speed sensor 27. As in the sensors that are mentioned, there may also be further sensors.

The control device 3 furthermore has a control unit 31 and a first power output stage 32, as well as a second power output stage 33. Depending on the control command from the higher-level control device and depending on the actual values I_AV1, I_AV2 of the current through the first coil and through the second coil 113, 115, the control unit 31 produces control signals for the control lines L1, L2, L3, via which the control unit 31 is electrically conductively connected to the first output stage 32, and control signals for the control lines L1', L2', L3', via which the control unit 31 is electrically conductively connected to the second output stage 33. The first and second power output stages 32, 33 differ only in that the first power output stage 32 is provided for driving the first coil 113, and the second power output stage 33 is provided for driving the second coil 115. The circuit arrangement and the method of operation of their components are equivalent.

Figure 2:
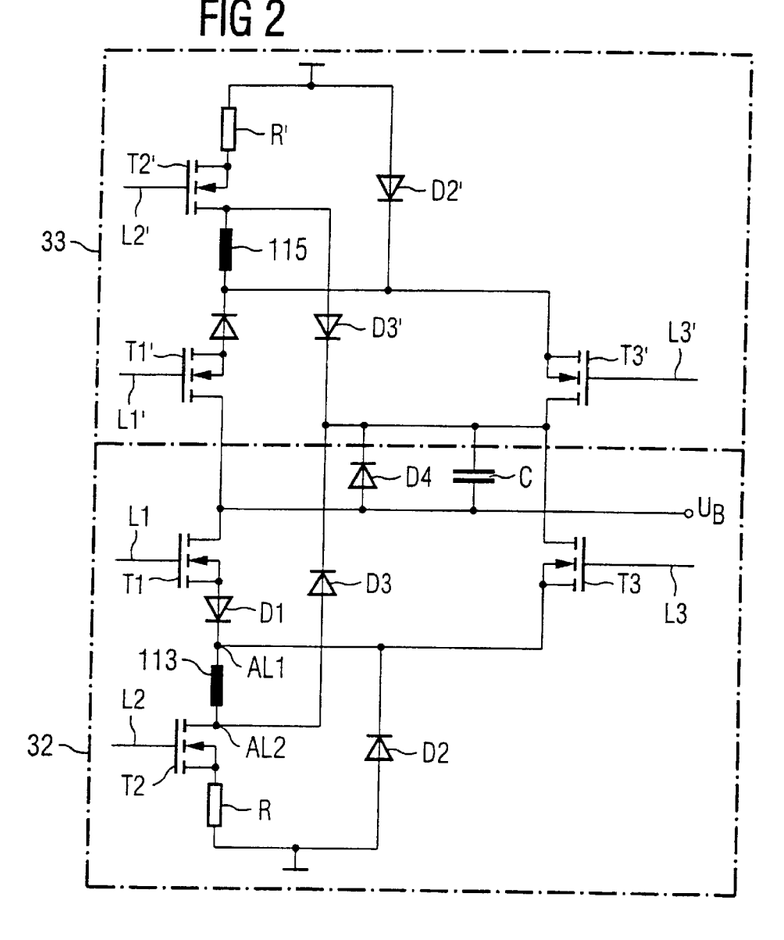
FIG. 2 is a schematic circuit diagram of two power output stages of the control device.

Referring now to FIG. 2, there is illustrated an exemplary embodiment of the first power output stage 32. The first power output stage 32 has a first transistor T1 whose gate connection is electrically conductively connected to the control line L1, a second transistor T2 whose gate connection is electrically conductively connected to the control line L2, and a third transistor T3 whose gate connection is electrically conductively connected to a control line L3.

The first power output stage 32 furthermore has diodes D1, D3, D4, a free-wheeling diode D2, an electrical energy store which is preferably in the form of a capacitor C, and a resistor R which is provided as a measurement resistor for the current measuring device 34.

The first power output stage 32 can be switched to five different operating states BZ1, which are in each case wherein by the respective switching state of the transistor T1, T2, T3. If a high voltage potential is applied to the gate connections of the transistors T1, T2, T3, which are preferably in the form of MOS transistors, then the respective transistor T1, T2, T3 is switched on (ON) from its drain connection to the source connection. If, in contrast, a low voltage potential is applied to the respective transistor T1, T2, T3 at its gate connection, then the transistor is switched off (OFF) from its drain connection to its source connection.

Figure 3A:
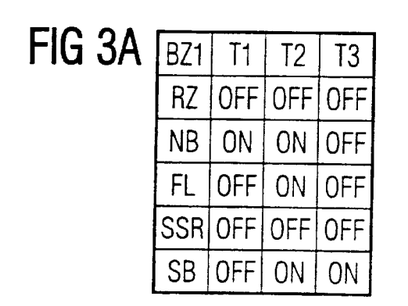
FIGS. 3A and 3B are tables of the operating states for the first and second power output stages.

FIG. 3a shows the five operating states BZ1 with the associated switching states of the transistors T1, T2, T3. The five operating states BZ1 are a quiescence state RZ, normal current NB, free-wheeling FL, high-speed current reduction SSR and high-speed current flow SB.

In the operating state BZ1 of normal current flow NB, the transistors T1 and T2 are switched on (ON), and the transistor T3 is switched off (OFF). Current then flows from a voltage source at the same potential as the supply voltage UB through the transistor T1, the diode D1, the connection AL1 of the first coil 113, through the first coil 113 to the connection AL2 of the first coil 113, through the transistor T2 and the resistor R to a ground connection, which is at a reference ground potential.

Provided the coil is not saturated, virtually all the supply voltage $U_B$ is dropped across the first coil 113. The current rises corresponding to the ratio of the voltage drop across the first coil 113 and the inductance of the first coil 113.

In the operating state of free-wheeling FL the transistor T2 is switched on (ON) while, in contrast, the transistors T1, T3 are switched off (OFF). If a current is flowing from the connection AL1 through the first coil 113 to the connection AL2 at the time of the transition to the operating state of free-wheeling FL, then the free-wheeling diode D2 is forward-biased, and the current through the first coil 113 decreases as a function of the loss in the coil 113, in the transistor T2, in the resistor R and in the free-wheeling diode D2. The voltage drop across the first coil 113 is then governed by the forward voltages of the free-wheeling diode and of the transistor T2, and by the voltage drop across the resistor R (for example one Volt overall).

In an operating state BZ1 of high-speed current reduction SSR, the transistors T1, T2 and T3 are switched off. If a current is flowing through the first coil 113 while the transition to the operating state BZ1 of high-speed current reduction SSR takes place, then the free-wheeling diode D2 and the diode D3 are forward-biased. The current then flows from the reference ground potential via the free-wheeling diode D2 to the connection AL1 of the first coil 113, and then through the first coil 113 to the connection AL2. From there, the current flows via the diode D3 to the capacitor C, and charges it.

The current through the first coil 113 is reduced in the operating state of high-speed current reduction SSR considerably more quickly than in the operating state BZ1 of free-wheeling FL, since, in the first coil 113, the negative supply voltage $U_B$ decreases, reduced by the voltage drop UT across the capacitor C and by the forward voltages of the free-wheeling diode D2 and of the diode D3. The first coil 113 and the capacitor C form a first resonant circuit in the operating state of high-speed current reduction SSR.

In the operating state of high-speed current flow SB, the first transistor T1 is switched off (OFF), and the transistors T2 and T3 are switched on (ON). Current flows from the voltage source via the capacitor C, which is discharged in the process, through the transistor T3 to the connection AL1 of the first coil 113, and through the first coil 113 to the connection AL2 of the first coil 113, then through the transistor T2 and the resistor R2 to the reference ground potential.

In the operating state of high-speed current flow SB, the voltage drop across the first coil 113 is equal to the sum of the supply voltage $U_B$ and the voltage drop across the capacitor C reduced by the forward voltages of the transistors T2 and T3 and the voltage drop across the measurement resistor R. The voltage drop across the first coil 113 is then, for example, about 80 Volts if the supply voltage UB is about 42 Volts. The rise in the current through the first coil 113 is then approximately twice as great as if only the supply voltage $U_B$ were dropped across the first coil 113. The voltage potential $U_B$ on the capacitor C can be tapped off, and can be supplied to the immobilizer unit 311.

Figure 3B:
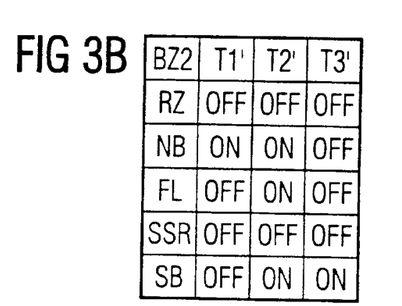

The components in the second power output stage are equivalent to those in the first power output stage 32, and are identified by a prime in FIG. 3. The corresponding switching states of the transistors T1', T2', T3' in the second power output stage 33 are illustrated analogously to FIG. 3A in FIG. 3B.

Figure 4:
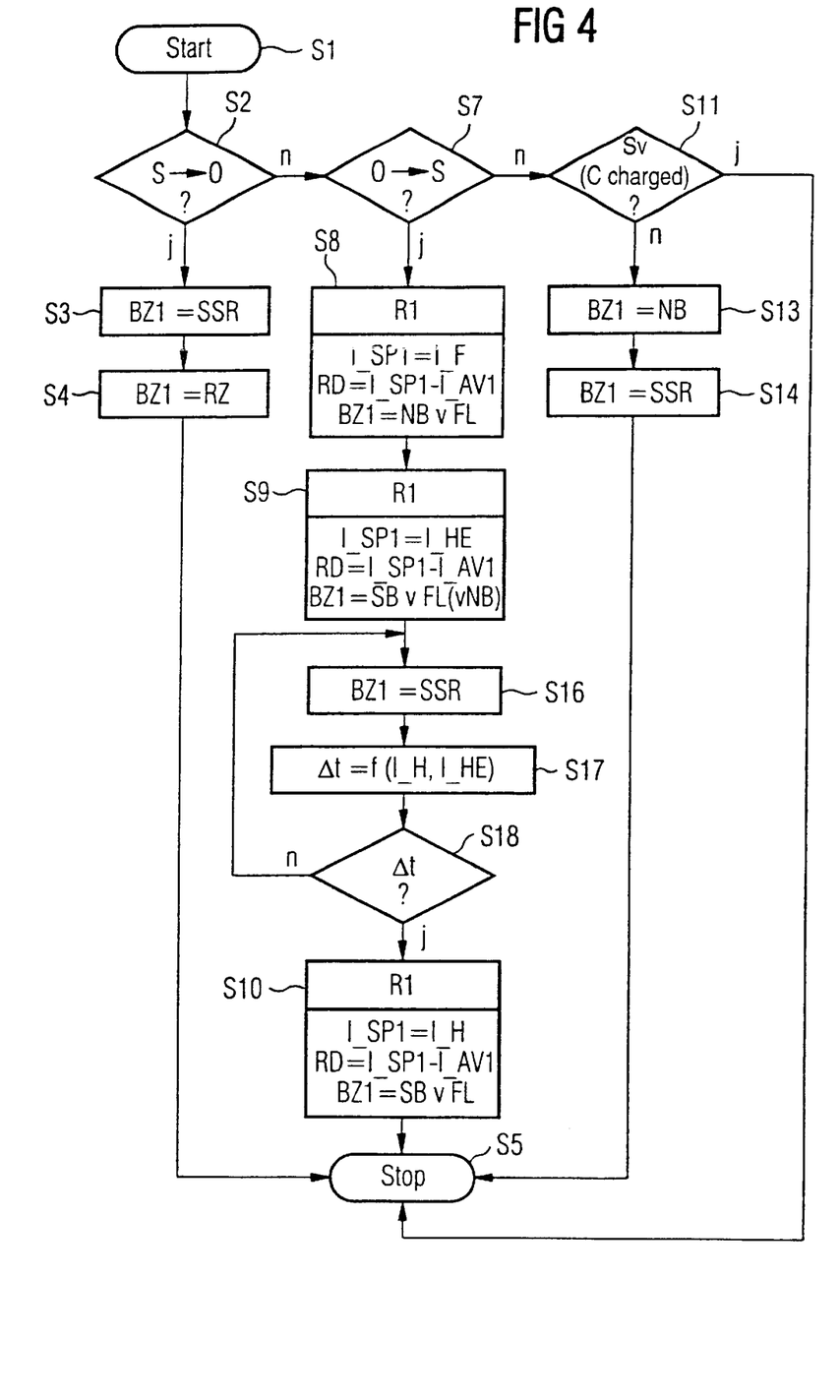
FIG. 4 is a flowchart for controlling the first coil.

FIG. 4 shows a flowchart of a first-program, which is processed in the control unit 31. The program starts in a step S1. The current nominal position of the armature plate 116 is read in, predetermined by the higher-level control device.

A check is carried out in a step S2 to determine whether the nominal position of the armature plate 116 has changed from the closed position S to the open position O since the first program was last called. If this is the case, then the first power output stage 32 is switched to the operating state BZ1 of high-speed current reduction SSR in a step S3. The first power output stage 32 changes to the operating state BZ1 of the quiescence state RZ as soon as the current through the first coil 113 becomes zero. The first program then ends, in the step S5.

If the condition in step S2 is not satisfied, then a check is carried out in a step S7 to determine whether the nominal position of the armature plate 116 has changed from the open position O to the closed position S since the first program was last called. If this is the case, a first regulator R1 is then activated in a step S8. The controlled variable of the first regulator R1 is the current through the first coil 113. A nominal value I_SP1 of the current through the first coil 113 is allocated a capture value I_F. A control difference RD is calculated from the difference between the nominal value T_SP1 and the actual value I_AV7 of the current through the first coil 113.

The first regulator R1 is preferably in the form of a two-point regulator. The first regulator R1 switches the first output stage 32 either to the operating state BZ1 of normal current flow NB or of free-wheeling FL, depending on the control difference RD. The regulator R1 remains activated until a predetermined condition is satisfied, which is an indication that the armature plate 116 has arrived at the first contact surface 115a. The predetermined condition may be, for example, that the armature plate has reached or moved past a predetermined position. This predetermined position is in this case chosen such that it is very close to the closed position S.

As soon as the predetermined condition is satisfied, the processing is continued in a step S9, wherein the first regulator is activated once again, with the nominal value I_SP1 of the current through the first coil 113 being an increased holding value I_HE. In step S9, the first regulator R1 switches the first power output stage 32 either to the operating state BZ1 of high-speed current flow SB or to the operating state BZ1 of free-wheeling FL or, if the capacitor C is discharged, to the operating state BZ1 of normal current flow NB, depending on the control difference RD.

Since the increased holding value I_HE is preferably greater than the capture value I_F, the first regulator first of all switches the first power output stage 32 to the operating state of high-speed current flow SB in the step S9, until the actual value I_AV1 of the current through the first coil is greater than the increased holding value I_HE, and/or switches it to the operating state of normal current flow, as soon as the capacitor C is discharged, to be precise until the actual I_AV1 of the current through the first coil is greater than the increased holding value I_HE.

At the time when the first regulator R1 is activated in the step S9, the actual position of the armature plate 116 is very close to or at the closed position S. For safe and reliable operation of the actuator, it is necessary to ensure that the armature plate is reliably in contact with the first contact surface and neither bounces nor drops back into the rest position N before reaching the closed position S. Switching to the operating state BZ1 of high-speed current flow SB makes it possible to set the actual value I_AV1 of the current through the first coil 113 to the increased holding value I_HE very quickly. This has the advantage that the first regulator R1 can be activated in the step S9 immediately before the armature plate 116 arrives at the first contact surface 115a, so that the speed of the armature plate is not significantly increased any more, and little noise is thus produced when the armature plate strikes the first contact surface 115a. Once a predetermined time period has elapsed, which is preferably determined by experiments, the processing is continued in a step S16.

In the step S16, the first power output stage 32 is switched to the operating state BZ1 of high-speed current reduction SSR.

A time period Δt is determined in a step S17, depending on the value of the increased holding current I_HE and the holding current I_H. The time period Δt is a measure of the time period which the actual value I_AV1 of the current through the first coil requires in order to fall from the increased holding current I_AE to the holding current I_H. A family of characteristics may be used, for example, to determine the time period Δt in the step S17. However, as an alternative, the time period Δt may also be predetermined as a fixed value.

A check is carried out in a step S18 to determine whether the time period since leaving the step S9 and the start of processing of the step S16 is longer than the time period Δt. If this is not the case, then the processing is continued in the step S16, and the operating state BZ1 of high-speed current reduction SSR is still selected. In this case, renewed processing of the step S17 can also be suppressed.

However, if the condition in step S18 is satisfied, then it can be assumed that the actual value I_AV1 of the current through the first coil has fallen at least to the holding current I_H. Selecting the operating state BZ1 of high-speed current reduction ensures that the actual value I_AV1 of the current through the first coil is reduced very quickly from the increased holding value I_HE to the holding value I_H. The time period Δt is, for example, approximately 150 to 200 μs, which is less than ⅕ of the time period which would be required, in order to change the current from the increased holding value I_HE to the holding value I_H if the coil were switched to the operating state BZ1 of free-wheeling FL.

In the step S10, the first regulator R1 is activated, the nominal value I_SP1 of the current through the first coil 113 is the holding value I_H, and the regulator switches the first power output stage 32 either to the operating state BZ1 of normal current flow NB or to free-wheeling FL, depending on the control difference RD, until the nominal position of the armature plate changes from the closed position S to the open position O. The processing of the program is then ended in step S5.

If the condition in step S7 is not satisfied, then the processing is continued in a step S11, wherein a check is carried out to determine whether the nominal position of the armature plate 116 is the closed position S, or whether the capacitor C is charged to a predetermined value.

It is advantageous to provide a sensor which detects the voltage drop $U_C$ across the capacitor C, with the charge on the capacitor C being determined from the detected voltage drop $U_C$. If the condition in step S11 is satisfied, then the first regulator R1 remains active as in step S10, provided the nominal position of the armature plate 116 is the closed position S, and the first program is ended in step S11. However, if the condition in step S11 is not satisfied, then the processing is continued in a step S13, wherein the first power output stage 32 is switched to an operating state BZ1 of normal current flow NB, to be precise either for a fixed predetermined time period or until the actual value I_AV1 of the current through the first coil 113 has reached a predetermined value. Then, in a step S14, the power output stage 32 is switched to the operating state BZ1 of high-speed current reduction SSR. The capacitor C can then easily be charged, while no current flows through the first coil 113 to catch or to hold the armature plate 116. The processing of the program is then ended in step S5.

The first program is called cyclically, to be precise either at predetermined time intervals or after a predetermined change in the crankshaft angle. While the nominal position of the armature plate 116 is the open position O, the first power output stage 32 is thus switched in steps S3, S16 and S14 to the operating state BZ1 of high-speed current reduction SSR, so that the capacitor C is charged to the predetermined value within a predetermined time period.

It is advantageous for the first coil 113 to be switched to the operating state of free-wheeling in the step S8 as soon as the armature plate has been supplied with the amount of energy required to reach the closed position S. The first coil 113 freewheels FL when the predetermined condition is satisfied, and this is an indication that the armature plate 116 has arrived at the first contact surface 115a.

Figure 5:
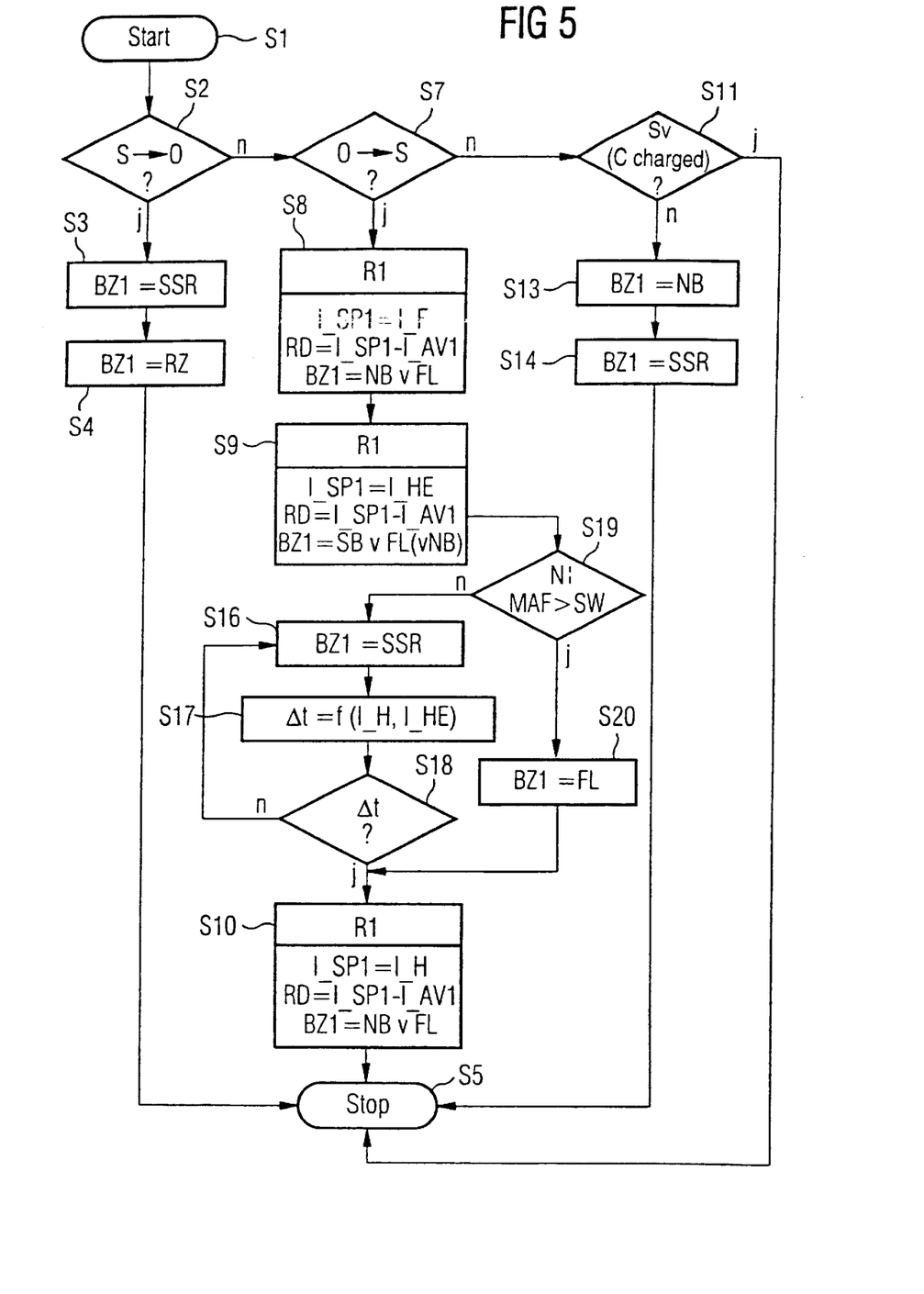
FIG. 5 is a further flowchart for controlling the first coil.

FIG. 5 shows a flowchart of a second program for controlling the first coil 113, and this is processed in the control unit 31. The second program has the same structure as the first program (FIG. 4). Only the differences from the first program will be described in the following text.

Following the processing in the step S9, a check is carried out in a step S19 to determine whether a variable which represents the load is greater than a predetermined threshold value SW. The variable which represents the load is, for example, the rotation speed N and/or the air mass flow MAF. The threshold value is preferably determined by the experiments on an engine test rig. In this case, for example, a check is carried out in the step S19 to determine whether the rotation speed is greater than a predetermined value, and whether the air mass flow MAF is at the same time less than a predetermined further value. If this is the case, then it can be assumed that the inlet or outlet valve has been switched to the open switching state only for an extremely short time period. The open switching state is the open position O. The processing is then continued, after this, in the step S16.

If, on the other hand, the condition in step S19 is satisfied, then the processing is continued in a step S20, wherein the first power output stage 32 is switched to the operating state BZ1 of free-wheeling FL. The operating state BZ1 of free-wheeling is maintained in step S20 until the actual value I_AV1 through the first coil has approximately reached the holding value I_H. In this embodiment of the program, the operating state BZ1 of high-speed current reduction SSR is selected only when the condition predetermined in step S19 is satisfied. This ensures that only operating states wherein the time period during which the open position is predetermined for the armature plate is so short that it is only the procedure in accordance with steps S16 to S18 which ensures that the regulator R1 can become active in the step S10 before the current through the first coil is switched off, that is to say that a defined current level—the holding value I_H is present on switching off. In contrast, in other situations, the operating state of free-wheeling is selected in the step S20, wherein the losses are low.

Figure 6A:
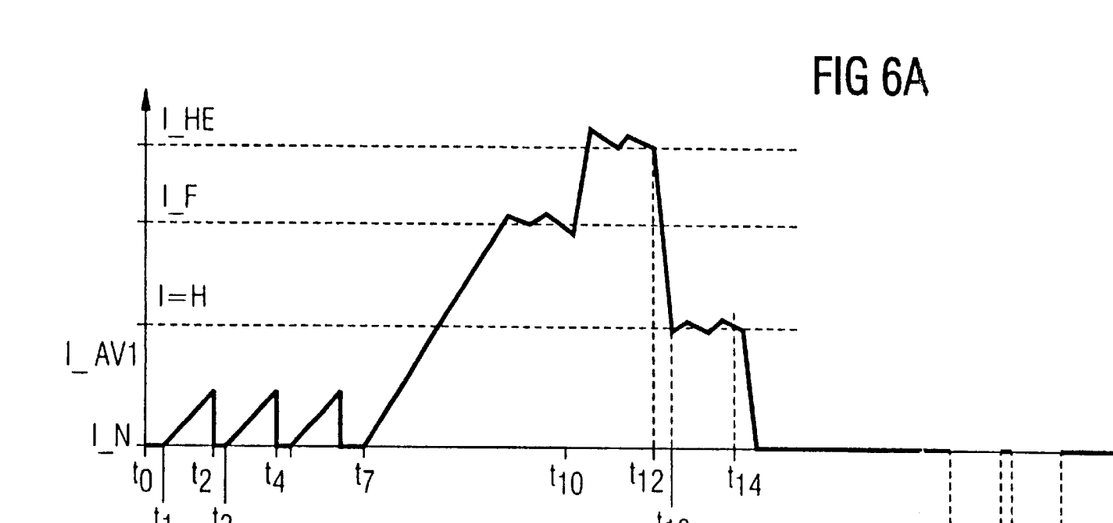
FIGS. 6A–6E are graphs showing various signal profiles of the current and of the voltages.
Figure 6B:
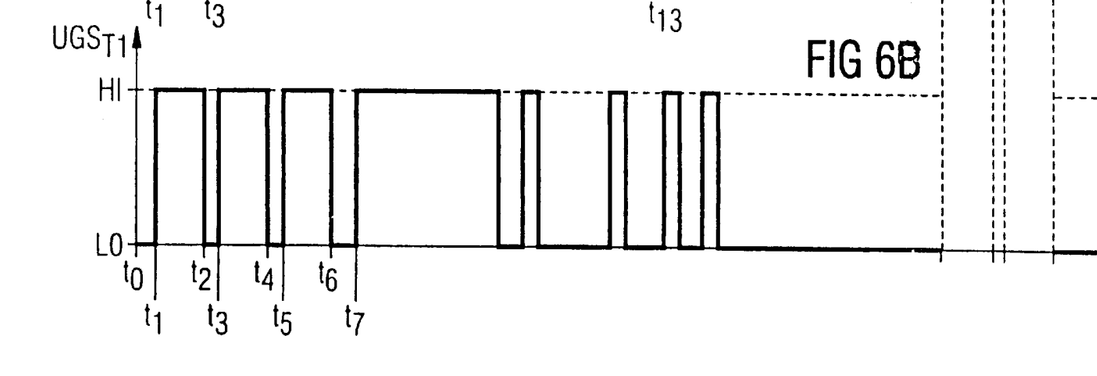
Figure 6C:
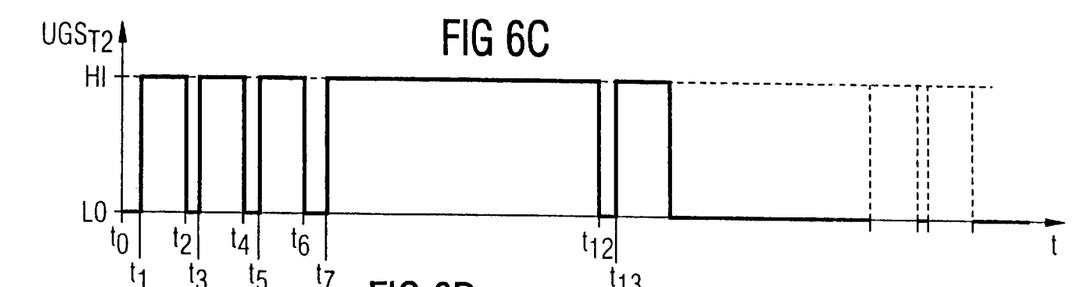
Figure 6D:
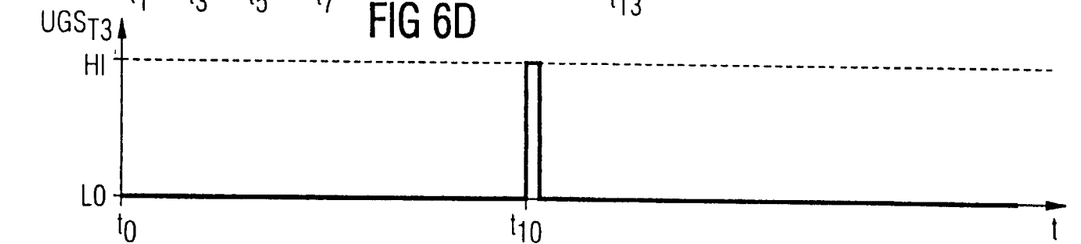
Figure 6E:
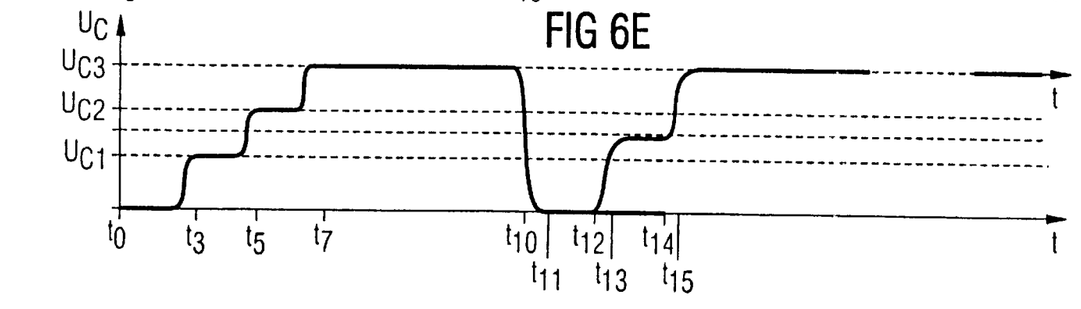

FIGS. 6A to 6E show signal profiles plotted over the time t. FIG. 6A shows the time profile of the actual value I_AV1 of the current through the first coil 113. FIG. 6B shows the time profile of the voltage difference $UGS_{T1}$ between the gate terminal and the source terminal of the transistor T1. FIG. 6C shows the time profile of the voltage difference $UGS_{T2}$ between the gate terminal and the source terminal of the transistor T2. FIG. 6D shows the time profile of the voltage difference $UGS_{T3}$ between the gate terminal and the source terminal of the transistor T3. FIG. 6E plots the voltage drop $U_C$ across the capacitor C over the same time t axis as FIGS. 6A–6D.

If the voltage difference $UGS_{T1}$ is at a high level HI, the transistor T1 is switched on (T1=ON). If the voltage difference $UGS_{T1}$ across the transistor T1 is at a low level L0, the transistor is switched off (T1=OFF). The transistor T2 is likewise switched on when the voltage difference $UGS_{T2}$ is at a high level III (T2=ON), and the transistor T2 is switched off when the voltage difference $UGS_{T2}$ is at a low level LO (T2=OFF). If the voltage difference $UGS_{T3}$ between the gate connection and the source connection of the transistor T3 is at a high level, then the transistor T3 is switched on (T3=ON). If the voltage difference $UGS_{T3}$ between the gate connection and the source connection of the transistor T3 is at a low level, then the transistor T3 is switched off (T3=OFF).

At a time $t_0$ the nominal position of the armature plate 116 is the open position O. The actual value I_AV1 of the current through the coil is zero. At a time $t_1$, the first power output stage 32 is switched to an operating state of normal current flow NB, to be precise until the time $t_2$.

From the time $t_2$ the first power output stage 32 is switched to the operating state BZ1 of high-speed current reduction SSR.

By the time $t_3$, the voltage drop $U_C$ across the capacitor C has increased to a value $U_{C1}$. After the time $t_3$, the first power output stage 32 is then once again switched to the operating state BZ1 of normal current flow NB, to be precise until a time $t_4$. After the time $t_5$, the first power output stage 32 is then once again switched to the operating state BZ1 of high-speed current reduction SSR, so that the voltage drop $U_c$ across the capacitor C has the value $U_{C2}$ at the time $t_5$.

After the time $t_5$, the first power output stage 32 is then once again switched to the operating state BZ1 of normal current flow, to be precise until a time $t_6$, at which it is then once again switched to the operating state BZ1 of high-speed current reduction SSR, until the time $t_7$. After the time $t_7$, the nominal value I_SP1 of the current through the first coil is the capture value I_F, and the first regulator R1 is activated in the same way as in step S8 (FIG. 4), to be precise until, at a time $t_{10}$, the position of the armature plate 116 has reached a predetermined value close to or directly against the first contact surface 115$a$. After the time $t_{10}$, the first power output stage 32 is switched to the operating state of high-speed current flow SB in order to change the actual value I_AV1 of the current through the first coil very quickly to the new nominal value I_SP1, to be precise the increased holding value I_HE thus, if necessary, preventing any threat of the armature falling back into the rest position N, or severe bouncing of the armature plate 116. In the process, the capacitor C is discharged, and the voltage drop across the capacitor $U_C$ is accordingly reduced to the value zero at the time $t_{11}$.

The increased holding current I_HE then flows through the first coil 113 until the time $t_{12}$. After the time $t_{12}$, the first power output stage 32 is switched to the operating state of high-speed current reduction SSR, as a result of which the current through the first coil 113 falls steeply.

After the time $t_{13}$, the holding value I_H is predetermined as the nominal value I_SP1 of the current through the first coil and, after the time $t_{14}$, the open position O is predetermined as the nominal position.

The time t14 is advantageously calculated in advance, to be precise such that, taking account of the sticking time, the armature plate is detached from the contact surface at a time predetermined in advance. This makes it possible to accurately set the air mass in the respective cylinder of the internal combustion engine. The sticking time is preferably determined from a family of characteristics, as a function of the holding value I_H of the current. Since the holding value differs only slightly while the internal combustion engine is in different operating states, the family of characteristics can be determined with little effort by experiments on an engine test rig. The sticking time can be determined even more precisely if the values of the family of characteristics are adapted as a function of a measured sticking time, which is determined as a function of the position of the armature plate and of the time. As an alternative to the position, some other signal which signals movement of the armature plate can also be used here.

The invention is not restricted to the described exemplary embodiment. By way of example, the control device 3 and the higher-level control device for engine operating functions may also form a unit.

We claim:

1. A method for controlling an actuator, the actuator including an actuating element and an actuating drive with at least one electromagnet having a coil, and an armature movably disposed between a first contact surface on the electromagnet and a second contact surface, the method which comprises:

conducting an initial high holding current with a given polarity through the coil until a time at which the armature is reliably in contact with the first contact surface on the electromagnet;

subsequently selecting an operating state of high-speed current reduction, and thereby applying to the coil an opposite polarity of a supply voltage in comparison with the given polarity until a holding current has been reached; and conducting the holding current through the coil for keeping the armature in contact with the first contact surface on the electromagnet.

2. The method according to claim 1, wherein the operating state of high-speed current reduction comprises charging an electrical energy store from the coil.

3. The method according to claim 1, wherein the operating state of high-speed current reduction is selected for a predetermined time period, and the time period is determined as a function of the holding current and the initial high holding current.

4. In an internal combustion engine, a method for controlling an actuator encompassing a gas exchange valve of the internal combustion engine and an actuating drive with at least one electromagnet having a coil, and an armature operatively connected with the gas exchange valve and movably disposed between a first contact surface on the electromagnet and a second contact surface, the method which comprises:

conducting an initial high holding current with a given polarity through the coil until a time at which the armature is reliably in contact with the first contact surface on the electromagnet;

subsequently selecting one of the following two operating states:

an operating state of high-speed current reduction, and thereby applying to the coil an opposite polarity of a supply voltage in comparison with the given polarity until a holding current has been reached; and an operating state of free-wheeling when a condition is satisfied that depends on at least one variable representing a load on the internal combustion engine;

and subsequently conducting a holding current through the coil for keeping the armature in contact with the first contact surface on the electromagnet.

5. The method according to claim 4, wherein the variable representing the load on the engine is selected from at least one parameter from the group consisting of an air mass flow and a speed of the engine.

6. The method according to claim 1, wherein the operating state of high-speed current reduction is selected for a predetermined time period, and the time period is determined as a function of the holding current and the initial high holding current.

* * * * *